United States Patent [19]

Manz et al.

[11] Patent Number: 5,211,024
[45] Date of Patent: May 18, 1993

[54] REFRIGERANT FILTRATION SYSTEM WITH FILTER CHANGE INDICATION

[75] Inventors: Kenneth W. Manz, Paulding; Christopher M. Powers, Bryan, both of Ohio

[73] Assignee: SPX Corporation, Muskegon, Mich.

[21] Appl. No.: 870,812

[22] Filed: Apr. 20, 1992

[51] Int. Cl.$^5$ .............................................. F25B 43/00
[52] U.S. Cl. ........................................ 62/126; 62/129; 62/149; 62/195; 340/607
[58] Field of Search .................. 62/125, 126, 127, 129, 62/149, 85, 195, 475; 340/609, 607, 608, 606; 73/861.43, 861.44; 210/87, 88, 89; 55/270, 271, 274, 215, DIG. 34

[56] References Cited

U.S. PATENT DOCUMENTS

| | | | |
|---|---|---|---|
| 4,476,688 | 10/1984 | Goddard | 62/475 X |
| 4,918,426 | 4/1990 | Butts et al. | 340/607 X |
| 4,942,741 | 7/1990 | Hancock et al. | 62/149 X |
| 5,033,271 | 7/1991 | Manz et al. | 62/125 |
| 5,040,382 | 8/1991 | Abraham | 62/149 X |
| 5,076,063 | 12/1991 | Kamegasawa et al. | 62/149 X |

*Primary Examiner*—Harry B. Tanner
*Attorney, Agent, or Firm*—Barnes, Kisselle, Raisch, Choate, Whittemore & Hulbert

[57] ABSTRACT

Apparatus for purification of a single refrigerant type, or of differing refrigerant types having differing density and moisture solubility characteristics, that includes a filter/drier unit for removing water from refrigerant passing therethrough and having a predetermined water absorption capacity. A refrigerant pump, such as a refrigerant compressor, pumps refrigerant through the filter/drier unit during recovery of refrigerant from equipment under service and/or in a separate refrigerant purification cycle. A flow meter is coupled to the filer/drier unit for measuring volumetric flow of refrigerant passing through the filter/drier unit. Volumetric flow of refrigerant through the flow meter is monitored over time for indicating to an operator when the filter/drier unit should be replaced as a function of mass of refrigerant pumped through the filter/drier unit and independent of types of refrigerant pumped through the filter/drier unit. Operation of the refrigerant pump may be inhibited upon indication that the filter/drier unit should be replaced.

7 Claims, 3 Drawing Sheets

REFRIGERANT FILTRATION SYSTEM WITH FILTER CHANGE INDICATION

FILTER CHANGE INDICATION

The present invention is directed to systems for recovering refrigerant from refrigeration equipment such as air conditioning and heat pump equipment for storage and reuse, and more particularly to a refrigerant recovery and purification system that includes one or more filters for removing water and other contaminants from refrigerant passing therethrough.

BACKGROUND OF THE INVENTION

Many scientists contend that release of halogen refrigerants into the atmosphere deleteriously affects the ozone layer that surrounds and protects the earth from ultraviolet solar radiation. Recent international discussions and treaties, coupled with related regulations and legislation, have renewed interest in devices for recovery and storage of used refrigerants from refrigeration equipment for later purification and reuse or for proper disposal. U.S. Pat. No. 4,261,178, assigned to the assignee hereof, discloses a refrigerant recovery system in which the inlet of a compressor is coupled through an evaporator and through a manual valve to the refrigeration equipment from which refrigerant is to be recovered. The compressor outlet is connected through a condenser to a refrigerant storage container. The condenser and evaporator are combined in a single assembly through which cooling air is circulated by a fan. Content of the storage container is monitored by a scale on which the container is mounted for sensing weight of liquid refrigerant in the container, and by a pressure switch coupled to the fluid conduit between the condenser and the container for sensing vapor pressure within the storage container. A full-container condition sensed at the scale or a high-pressure condition sensed at the pressure switch terminates operation of the compressor motor. A vacuum switch is positioned between the inlet valve and the evaporator for sensing evacuation of refrigerant from the refrigeration system and automatically terminating operation of the compressor motor.

U.S. Pat. Nos. 4,768,347 and 4,809,520, also signed to the assignee hereof, disclose a refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics, and associated valves and hoses.

U.S. Pat. No. 4,805,416, also assigned to the assignee hereof, discloses a number of refrigerant recovery and purification systems in which a refrigerant pump, comprising either the recovery compressor or a separate liquid refrigerant pump, is connected to the storage container for circulating refrigerant from the storage container through a filter/drier for removing water and other contaminants from the refrigerant, and then directing the refrigerant back to the storage container. Operative condition of the filter is indicated by a sight glass positioned in the refrigerant filtration path for indicating concentration of water within the refrigerant, and/or by a differential pressure gauge connected across the refrigerant filter for indicating pressure drop across the filter. The replaceable core of the filter/drier is changed when the differential pressure gauge indicates an excessive pressure differential across the filter/drier unit, or when the sight glass indicates that moisture is not being removed from the refrigerant by the filter/drier.

The sight glass moisture indicator is inexpensive, but does not reliably indicate dry refrigerant for some types of refrigerants. Furthermore, the chemical salts that indicate moisture concentration can be stained or washed off. Even under the best of conditions, conventional sight glass/moisture indicators are not sufficiently sensitive for new refrigerant purity standards on the order of ten parts per million. Moisture content of refrigerant can also be determined through conventional chemical tests, which require sampling of refrigerant and shipment to a laboratory, or on-site testing using a disposable kit or the like. Such chemical test techniques are not well suited, therefore, for use in conjunction with a refrigerant purification system to indicate when the replaceable filter/drier core should be changed.

OBJECTS AND SUMMARY OF THE INVENTION

There is therefore a need in the art for a reliable and economical method of assuring generation of clean refrigerant during a purification cycle, and of indicating to an operator when the replaceable core of the filter/drier unit should be changed. Moisture contained in the refrigerant recovered from an air-conditioning system is normally limited by saturation conditions. Saturation curves for each refrigerant are a function of temperature, with increasing water content with increasing temperature. The liquid saturation curve is distinctly different than the vapor saturation curve for each refrigerant. For some refrigerants, such as R12, the saturated vapor moisture concentration may be much higher than the liquid. For other refrigerants, such as R22, the liquid concentration may be much higher than the vapor.

In determining when to change the filter-drier the total water capacity of the filter-drier must first be determined in the application. This may be affected by the location of the drier, the temperature, the state (liquid or vapor) of the refrigerant, and whether the refrigerant passes through the filter-drier once (single pass) or many times (multiple pass) during the recovery or recycle process. The second factor is the amount of refrigerant passed through the filter-drier, which can be determined as the product of the volumetric flow rate, the density and the time. The density is a function of the evaporator temperature, the type of refrigerant, and whether liquid or vapor refrigerant is fed to the recovery unit inlet. FIGS. 3 and 4 illustrate density of various refrigerants versus temperature for liquid and vapor refrigerants respectively.

The third factor is moisture content of the refrigerant entering the filter-drier. When a moisture transducer is not employed, a maximum wetness to be expected must be assigned based upon operating conditions for purposes of calculating the drops of water to be removed by the filter-drier. This moisture condition is limited by the vapor saturation curve at the relatively cool and controlled discharge temperature of the oil separator located between the evaporator and the compressor. FIGS. 5 and 6 illustrate moisture saturation versus temperature for R12 and R22 respectively. The horizontal lines R12 C/O in FIGS. 5 and R22 C/O in FIG. 6 indicate the maximum wetness to be encountered by the filter-drier. The region above the horizontal lines and below the saturation curves represents the region where moisture drops out in the oil separator. The region below the horizontal lines and above the saturation curves represents the region of exaggerated wetness or lost filter capacity.

The single transducer in the preferred embodiments of the invention is a volumetric flowmeter (cu. ft./min.). Calculations or experimental determinations are used to determine the quantity of water (g) the filter-drier can absorb in the application. A moisture flow rate coefficient (MFRC, g water/cu. ft.) is determined by the product of density (g refrigerant/cu ft) multiplied by vapor saturation (g water/g refrigerant) in the temperature range encountered at the oil separator discharge. Finally, the product of moisture flow rate coefficient and volumetric flow yields a calculated moisture flow rate (g water/min.) that, when integrated over time, yields maximum moisture (g water) to be absorbed by the filter-drier. When the moisture equals the filter-drier capacity, controls are used to signal the operator to change the filter-drier such as by lighting a light, sounding a buzzer, or terminating compressor operation.

For a single refrigerant system, such as R12 recycling in an automotive application, the preferred location of the flowmeter would be in the liquid line as shown in FIG. 2. Using R12 as an example, the 45° F. temperature at T2 corresponds to the 95° F. temperature at T3, and the 55° F. T2 corresponds to the 130° F. T3. While the moisture saturation (ppm) increases with temperature, the vapor density increases while the liquid density decreases. Assigning a relative value of one to the maximum moisture flow rate coefficient, the relative minimum calculations are shown below:

For R12 @50°, 95° F.
 MFRC=(79.5)*(0.000395)=0.0314 g water/cu. ft. liquid
 MFRC=(1.53)*(0.000395)=0.000604 kg water/cu. ft. vapor
For R12 @60°, 130° F.
 MFRC=(74.3)*(0.000475)=0.0353 g water/cu. ft. liquid
 MFRC=(1.8)*(0.000475)=0.000855 g water/cu. ft. vapor
Liquid 0.0314/0.0353=0.8895
Vapor 0.000604/0.000855=0.7064

Therefore, the liquid line location results in less unused filter-drier capacity over the temperature range.

For a multiple refrigerant system, such as a commercial recycling unit for refrigerants R12, R22, R502, and R134a, the preferred location of the flowmeter would be in the suction line between the oil separator 14 and the compressor (FIG. 1). This is demonstrated in Table V with supporting information on density and relative density in Tables II and III, and on moisture saturation in Table IV. The density of refrigerant 22 at 55° F. for vapor or 130° F. for liquid is used to normalize the flowmeter to read in mass units. The preference for placing the flowmeter in the suction line is that the refrigerants with the highest moisture content have the lowest vapor density. This means for a flowmeter reading of 1 g/min., less than 1 g would actually pass since the density of R12 vapor is less than R22 vapor density. The same characteristic is not true for liquid density, where R12 liquid density exceeds that of R22.

The problem of monitoring filter/drier capacity is compounded in recovery/purification systems intended and adapted for use in conjunction with multiple differing types of refrigerants, such as R12, R22, R134a and R502, having differing density and moisture solubility characteristics. It is a general object of the present invention to provide such a technique. Specifically, it is an object of the present invention to provide a mechanism for monitoring operation of the filter/drier unit in a refrigerant purification system constructed and adapted for use to recover and/or purify multiple differing refrigerants having differing density and solubility characteristics, and for indicating to an operator when the core of the filter/drier unit should be replaced independently of refrigerant type or types in connection with which the unit is operated, and without requiring knowledge or input of information indicating type or types of refrigerants in connection with which the unit is operated.

Apparatus for purification refrigerant in accordance with the present invention includes a filter/drier unit for removing water from refrigerant passing therethrough. A refrigerant pump, such as a refrigerant compressor, pumps refrigerant through the filter/drier unit during recovery of refrigerant from equipment under service and/or in a separate refrigerant purification cycle as disclosed in the patents discussed above. A flow meter is coupled to the filter/drier unit for measuring volumetric flow of refrigerant passing through the filter/drier unit. Volumetric flow of refrigerant through the flow meter is monitored over time, for indicating to an operator when the filter/drier unit should be replaced, as a function of mass of refrigerant pumped through the filter/drier unit. Operation of the refrigerant pump may be inhibited upon indication that the filter/drier unit should be replaced.

In apparatus for pumping multiple differing refrigerants having differing density and moisture solubility characteristics, the filter/drier and flow meter preferably are positioned where the refrigerant is in vapor phase, such as at the inlet to the compressor. In apparatus for a single refrigerant type, the filter/drier and flow meter are positioned where the refrigerant is in liquid phase, such as between the condenser and storage vessel.

BRIEF DESCRIPTION OF THE DRAWING

The invention, together with additional objects, features and advantages thereof, will be best understood from the following description, the appended claims and the accompanying drawing in which:

DETAILED DESCRIPTION OF PREFERRED EMBODIMENTS

Figure 1:
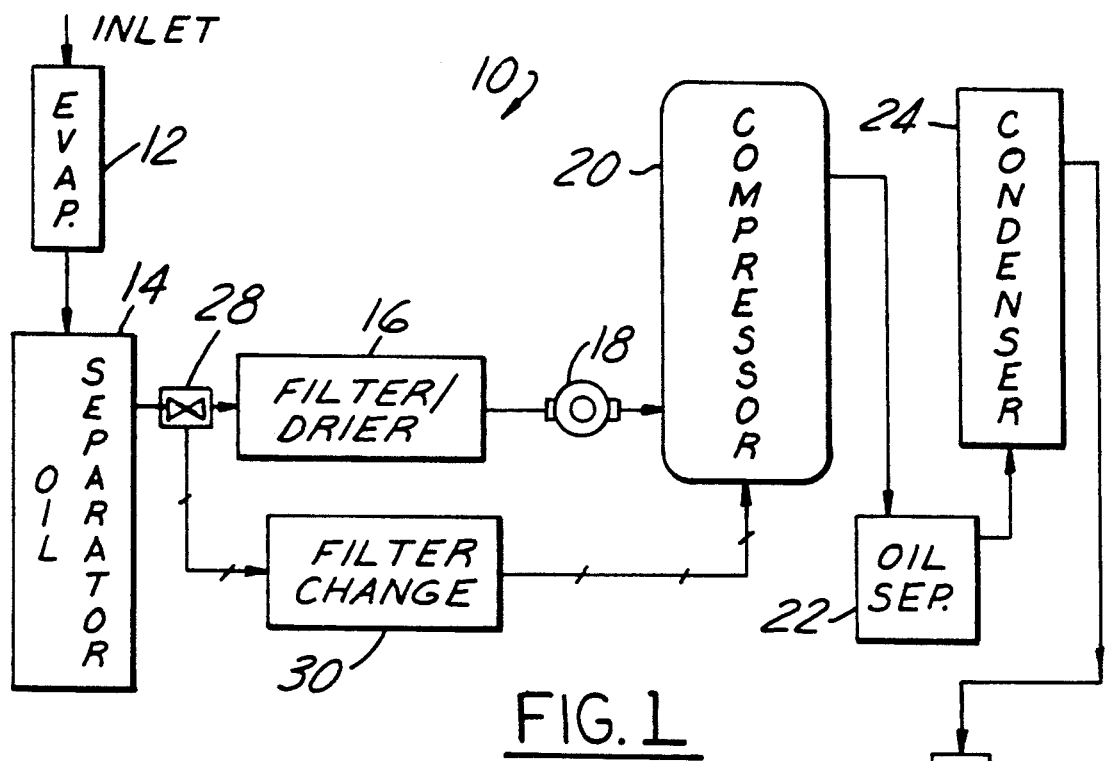
FIG. 1 is a schematic diagram of a refrigerant recovery system embodying a filter/drier monitor in accordance with a presently preferred embodiment of the invention.

FIG. 1 illustrates a refrigerant recovery system 10 as comprising a refrigerant evaporator 12 having an inlet for receiving refrigerant from refrigeration equipment under service, and an outlet connected through an oil separator 14, a filter/drier unit 16 and a sight glass/moisture indicator 18 to the inlet of a refrigerant compressor 20. Filter/drier 16 preferably comprises a conventional filter/drier unit having a replaceable desiccant core for absorbing water from refrigerant passing therethrough. Such filter/drier units have a predetermined water absorption capacity depending upon volume and desiccant type, such as 40 grams of water for example. The outlet of compressor 20 is connected through a compressor oil separator 22 and a refrigerant condenser 24 to a container 26 for storing refrigerant recovered from the unit under service. To the extent thus far described, refrigerant recovery system 10 is similar to systems disclosed in above-noted U.S. Pat. No. 4,805,416, to which reference may be made for more detailed discussion.

In accordance with the present invention, a flow meter 28 is connected between filter/drier unit 16 and oil separator 14 for measuring volumetric flow of refrigerant through the filter/drier unit and providing a corresponding electrical signal to a filter-change monitor 30. Filter monitor 30 monitors the output of flow meter 28 over time during operation of compressor 20, and indicates to an operator that the core of filter/drier unit 16 should be replaced as a function of mass of refrigerant pumped through the filter/drier unit. For example, as will be discussed in greater detail hereinafter, monitor 30 may indicate that the core of filter/drier unit 16 should be replaced when the reading from flow meter 28 indicates that 210 pounds of refrigerant have been pumped through the filter/drier unit, independent of the actual mass of refrigerant pumped through the filter/drier unit and independent of refrigerant type. Filter monitor 30 may also be connected to compressor 20 as shown in FIG. 1 for inhibiting operation of compressor 20, and thereby inhibiting further pumping of refrigerant through the filter/drier unit, when need for a filter change is indicated.

Figure 2:
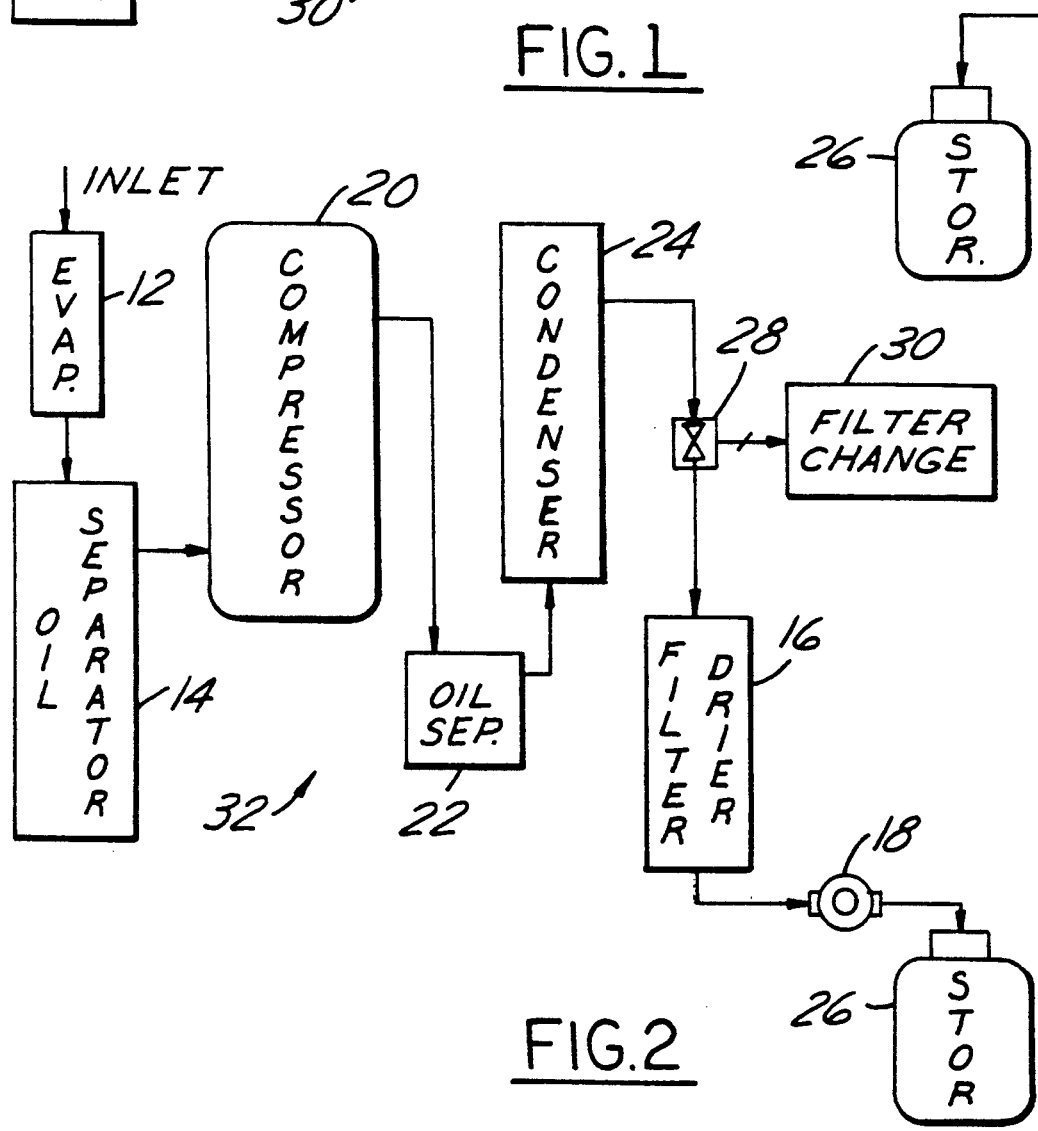
FIG. 2 is a schematic diagram showing a modification to the embodiment of the invention illustrated in FIG. 1.
Figure 3:
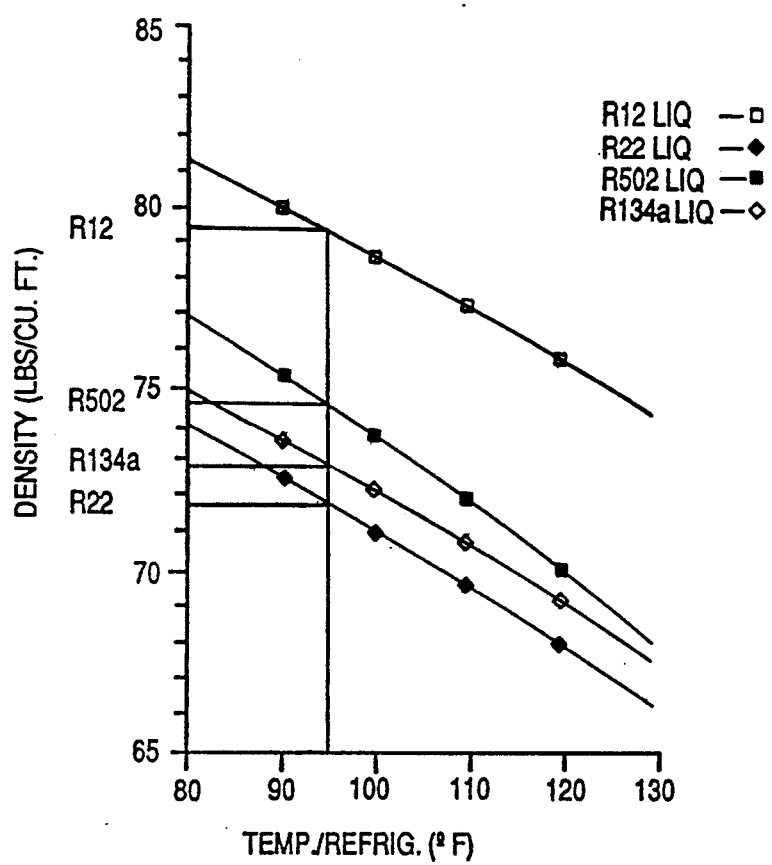
FIGS. 3-6 are graphs that illustrate characteristics of various refrigerants.
Figure 4:
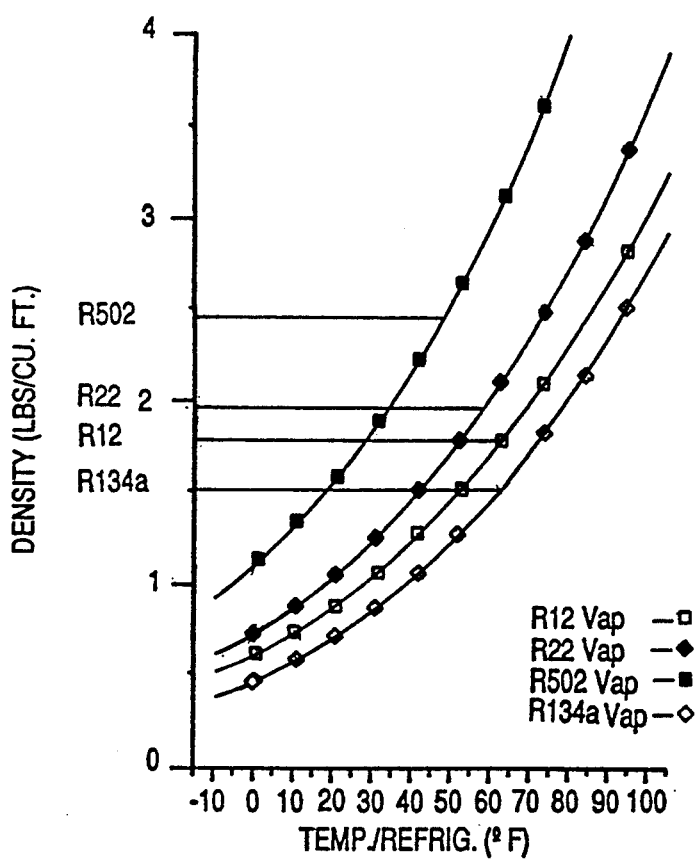
Figure 5:
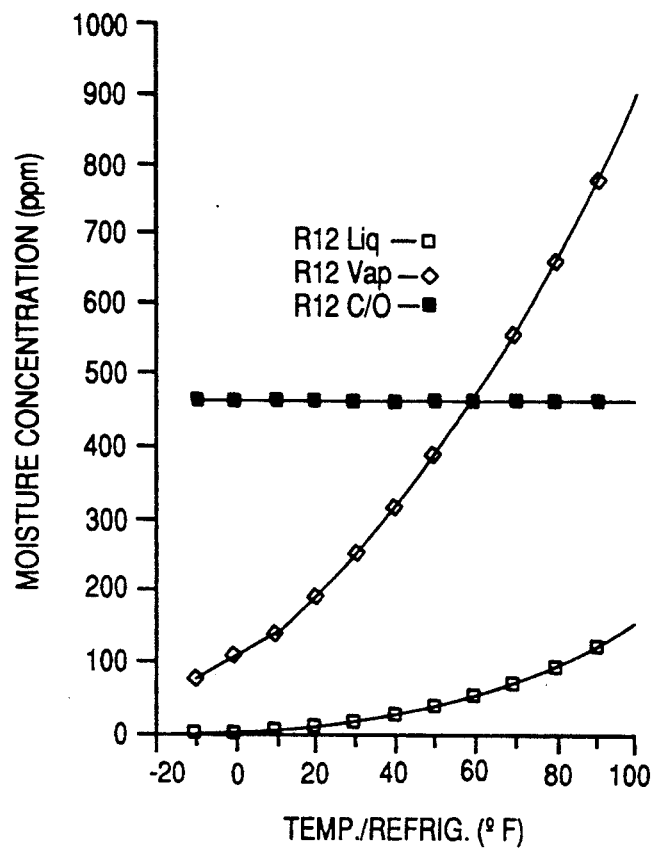
Figure 6:
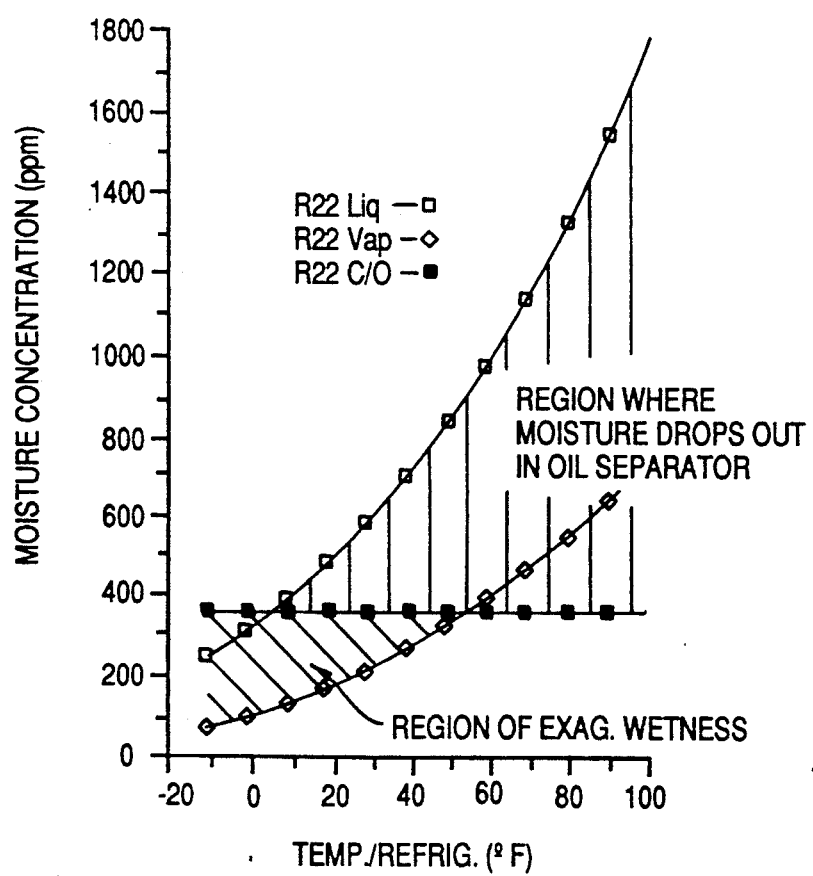

FIG. 2 illustrates a refrigerant recovery and purification system 32 that is essentially similar to system 10 of FIG. 1 except that filter/drier unit 16, sight glass/moisture indicator 18 and flow meter 28 are connected between condenser 24 and storage container 26. Thus, in the embodiment of FIG. 2, filter/drier unit 16 and flow meter 28 receive refrigerant in liquid phase from condenser 24, rather than refrigerant in vapor phase from oil separator 14 as in the embodiment of FIG. 1.

Table 1 shows typical temperatures at evaporator 12, oil separator 14 and condenser 24 in either FIGS. 1 or 2 under "low" ambient temperature conditions of 65° F. and "high" ambient temperature conditions of 100° F. for R12, R22, R502 and R134a refrigerant types:

TABLE I

Typical System Operating Temperatures (°F.)

| Refrig Type | Evap 12 T1, °F. | Oil Sep. 14 T2, °F. Low | Oil Sep. 14 T2, °F. High | Condenser 24 T3, °F. Low | Condenser 24 T3, °F. High |
|---|---|---|---|---|---|
| R12 | 50 | 50 | 60 | 95 | 130 |
| R22 | 45 | 45 | 55 | 95 | 130 |
| R502 | 35 | 35 | 45 | 95 | 130 |
| R134a | 50 | 50 | 60 | 95 | 130 |

Table II shows the densities of R12, R22, R502 and R134a refrigerants at low and high oil separator temperatures T2, and low and high condenser temperatures T3:

TABLE II

Refrigerant Vapor/Liquid Densities (lbs/ft³)

| Refrig Type | Vapor Density T2 Low | Vapor Density T2 High | Liquid Density T3 Low | Liquid Density T3 High |
|---|---|---|---|---|
| R12 | 1.5258 | 1.7909 | 74.367 | 79.470 |
| R22 | 1.655 | 1.9517 | 66.312 | 71.980 |
| R502 | 2.060 | 2.431 | 67.96 | 74.65 |
| R134a | 1.271 | 1.520 | 67.55 | 72.93 |

In system 10 of FIG. 1, vapor refrigerant leaving system oil separator 14 may pickup moisture from within the volume of the oil separator, but cannot carry more than the moisture solubility limit of refrigerant vapor at temperature T2. Moisture laden R12 refrigerant vapor would have a moisture content of 475 ppm at a temperature T2 of 60° F., while moisture laden R22 refrigerant would have a moisture solubility of 300 ppm at temperature T2 of 55° F. Table III shows moisture solubility for each refrigerant at the low and high oil separator outlet temperatures, and also for purposes of reference shows the moisture content of each refrigerant covered by the ARI740-91 certification method published by the Air-Conditioning and Refrigeration Institute. This certification method does not cover use of R134a refrigerant.

TABLE III

| Refrig Type | Moisture Solubility (ppm) T2 Low | Moisture Solubility (ppm) T2 High | ARI740 |
|---|---|---|---|
| R12 | 395 | 475 | 80 |
| R22 | 245 | 300 | 200 |
| R502 | 165 | 203 | 200 |
| R134a | 461 | 545 | N/A |

Table IV shows mass flow rates in pounds per minute for the various refrigerants normalized to R22=1.0 lbs/min at the high T2 and T3 temperatures:

TABLE IV

Mass Flow Rates, Normalized to R22 at T2 high and T3 high (lbs/min)

| Refrig Type | Vapor T2 Low | Vapor T2 High | Liquid T3 Low | Liquid T3 High |
|---|---|---|---|---|
| R12 | 0.782 | 0.918 | 1.200 | 1.123 |
| R22 | 0.848 | 1.000 | 1.086 | 1.000 |
| R502 | 1.056 | 1.246 | 1.127 | 1.026 |
| R134a | 0.651 | 0.779 | 1.101 | 1.020 |

Table V shows volumetric wetness in pounds of water per minute at a flow meter reading of 1.0 lbs. per minute, and is obtained by multiplying the figures of Table VI times the moisture solubility figures Table III:

TABLE V

| Refrig Type | Volumetric wetness, lbs/min water at a meter reading of 1.0 lbs/min | | | |
|---|---|---|---|---|
| | Vapor | | Liquid | |
| | T2 Low | T2 High | T3 Low | T3 High |
| R12 | 308.9 | 436.1 | 474.0 | 533.4 |
| R22 | 207.8 | 300.0 | 266.1 | 300.0 |
| R502 | 174.2 | 252.9 | 186.0 | 208.3 |
| R134a | 300.1 | 424.6 | 507.6 | 555.9 |

Assuming a desired end dryness of 15 ppm water and a filter/drier capacity of 40 g water, Table VI compares actual and metered mass flow readings for each of the refrigerants at saturation conditions at higher oil separator temperature T2 (Table I) and under ARI740 conditions:

TABLE VI

| Refrig Type | Refrigerant mass dried and flow meter readings at drier capacity of 40 g and dryness of 15 ppm (lbs) | | | |
|---|---|---|---|---|
| | T2 High | | ARI740 | |
| | Meter | Actual | Meter | Actual |
| R12 | 209.4 | 192.2 | 1477.9 | 1356.7 |
| R22 | 309.0 | 309.0 | 477.0 | 477.0 |
| R502 | 370.7 | 461.9 | 382.8 | 477.0 |
| R134a | 215.3 | 167.7 | N/A | N/A |

It will be noted that the minimum meter reading under ARI740 conditions is approximately 380 lbs. Table VII illustrates actual refrigerant mass flow, water absorbed and percent drier utilization at a meter reading of 380 lbs. under ARI740 test conditions:

TABLE VII

| Refrig Type | ARI740 conditions @ flow meter reading of 380 lbs. | | | |
|---|---|---|---|---|
| | Flow Meter (lbs) | Actual (lbs) | Water (g) | Percent Drier Saturation (%) |
| R12 | 380 | 350 | 10.3 | 25.7 |
| R22 | 380 | 380 | 31.9 | 79.7 |
| R502 | 380 | 475 | 39.9 | 99.7 |
| R134a | N/A | N/A | N/A | N/A |

Likewise, Table VI shows a minimum meter reading of 210 lbs. refrigerant under refrigerant saturation conditions at temperature T2, and Table VIII illustrates actual mass of refrigerant filtered for each refrigerant type, water absorbed and percent drier utilization for each type of refrigerant at temperature T2 saturation conditions:

TABLE VIII

| Refrig Type | Saturated Conditions @ T2 (Vapor) and flow meter reading of 210 lbs. | | | |
|---|---|---|---|---|
| | Flow Meter (lbs) | Actual (lbs) | Water (g) | Percent Drier Saturation (%) |
| R12 | 210 | 193 | 40.3 | 100.8 |
| R22 | 210 | 210 | 27.2 | 68.0 |
| R502 | 210 | 262 | 22.3 | 55.8 |
| R134a | 210 | 164 | 39.4 | 98.6 |

The moisture is determined by the vapor saturation characteristic of the refrigerant at temperature T2. It remains relatively constant throughout the system from that point on as there are no sources or sinks for moisture. Therefore, the location of the filter-drier is unimportant as long as it is beyond the oil separator 14. The exemplary calculations of Tables VII and VIII are based upon an assumed maximum filter/drier water absorption of 40 g. Where a greater filter/drier capacity is desired to increase the interval between filter/drier cartridge replacements, a larger filter/drier capacity would be required. It will be noted that it makes no difference whether the filter/drier unit is placed on the suction side of the compressor as illustrated in FIG. 1, or on the discharge side of the condenser as shown in FIG. 2, or both.

Table VIII thus shows that flow meter 28 in either FIGS. 1 or 2 may be monitored to the point where the flow meter shows a total mass flow of 210 lbs. of refrigerant, and monitoring circuitry 30 may at that point indicate to an operator that the filter cartridge should be replaced. If the refrigerant recovery/purification system has been employed in connection with R12 refrigerant, R134a refrigerant or a combination of the two, virtually all of the drier capacity will have been utilized. On the other hand, if the recovery system were employed wholly or partly in connection with R22 and/or R502 refrigerant a lower percentage of the filter capacity would have been utilized. However, the cost of under utilization of the filter capacity is outweighed by the desirability and accuracy of providing the operator with a definite indication of a need for changing the filter/drier cartridge, thereby eliminating the likelihood of continued use of the filter/drier cartridge after the cartridge has been fully saturated.

As a modification to the systems of FIGS. 1 and 2, the monitor 30 could be connected to illuminate a filter change lamp for R12 and R134a at a meter reading of 210 lbs., and a second lamp for R22 and R502 at a meter reading of 309 lbs. This would require some knowledge by the operator of the type of refrigerant in connection with which the system is utilized, but would permit a higher utilization of the filter/drier saturation capacity. As another alternative, a sensor could be coupled to the system refrigerant line for detecting the type of refrigerant flowing therethrough, and the sensor output could be coupled to a microprocessor for adding the water absorption calculations for the various refrigerants as they are processed until the total reaches the 40 g capacity of the filter/drier unit.

We claim:

1. Apparatus for purification of refrigerant apparatus comprising:
   replaceable filter/drier means for removing water from refrigerant passing therethrough,
   refrigerant pumping means for pumping refrigerant through said filter/drier means,
   a flow meter coupled to said filter/drier means for measuring volumetric flow of refrigerant passing through said filter/drier means, and
   means coupled to said flow meter for indicating when to replace said filter/drier means as a function of mass of refrigerant pumped through said filter/drier means.

2. The apparatus set forth in claim 1 wherein said indicating means comprises means for indicating that said filter/drier means should be replaced when mass of refrigerant indicated by said flow meter reaches a preselected level.

3. The apparatus set forth in claim 2 wherein said refrigerant pumping means comprises a compressor having an inlet and an outlet, and means for feeding refrigerant in vapor phase to said compressor inlet, said filter/drier means and said flow meter being connected between said feeding means and said compressor inlet.

4. The apparatus set forth in claim 2 wherein said refrigerant pumping means comprises a compressor having an inlet and an outlet, means for feeding refrigerant in vapor phase to said compressor inlet, and condensing means coupled to said compressor outlet for liquifying refrigerant from said compressor, said filter/drier means and said flow meter being coupled to said condensing means such that liquid phase refrigerant flows therethrough.

5. The apparatus set forth in claim 1 wherein said pumping means is operatively coupled to said indicating means for inhibiting operation of said pumping means when replacement of said filter/drier means is indicated.

6. Apparatus for purification of plural differing refrigerant types having differing density and moisture solubility characteristics, said apparatus comprising:
  replaceable filter/drier means for removing water from refrigerant passing therethrough,
  refrigerant pumping means for pumping refrigerant in vapor phase through said filter/drier means,
  a flow meter coupled to said filter/drier means for measuring volumetric flow of refrigerant passing through said filter/drier means, and
  means coupled to said flow meter for indicating when to replace said filter/drier means as a function of mass of refrigerant pumped through said filter/drier means independently of types of refrigerant pumped through said filter/drier means by said pumping means.

7. The apparatus set forth in claim 6 wherein said indicating means comprises means for indicating that said filter/drier means should be replaced when mass of refrigerant indicated by said flow meter reaches a preselected level.

* * * * *